D. Reed,
Making Cut Nails,
No. 85,478. Patented Dec. 29, 1868.

Witnesses:
J. H. Shumway
A. J. Tibbits

Daniel Reed
Inventor.
By his Attorney,
John E. Earle.

Sheet 2 - 2 Sheets.

D. Reed,
Making Cut Nails,

Nº 85,478. Patented Dec. 29, 1868.

Witnesses:
J. H. Shumway
A. J. Tibbits

Daniel Reed
Inventor.
By his Attorney,
John E. Earle.

N. PETERS, PHOTO-LITHOGRAPHER, WASHINGTON, D. C.

UNITED STATES PATENT OFFICE.

DANIEL REED, OF BIRMINGHAM, CONNECTICUT.

IMPROVEMENT IN NAIL-PLATE FEEDERS.

Specification forming part of Letters Patent No. 85,478, dated December 29, 1868; antedated December 24, 1868.

*To all whom it may concern:*

Be it known that I, DANIEL REED, of Birmingham, in the county of New Haven and State of Connecticut, have invented a new Improvement in Nail-Machine; and I do hereby declare the following, when taken in connection with the accompanying drawings and the letters of reference marked thereon, to be a full, clear, and exact description of the same, and which said drawings constitute part of this specification, and represent, in—

Figure 1:
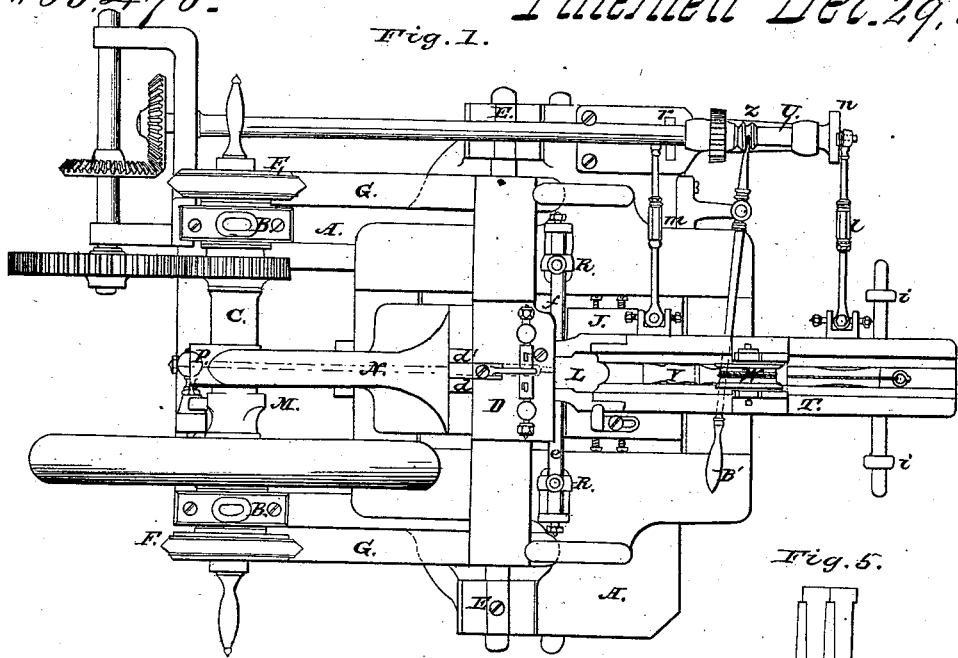
Figure 5:
Figure 2:
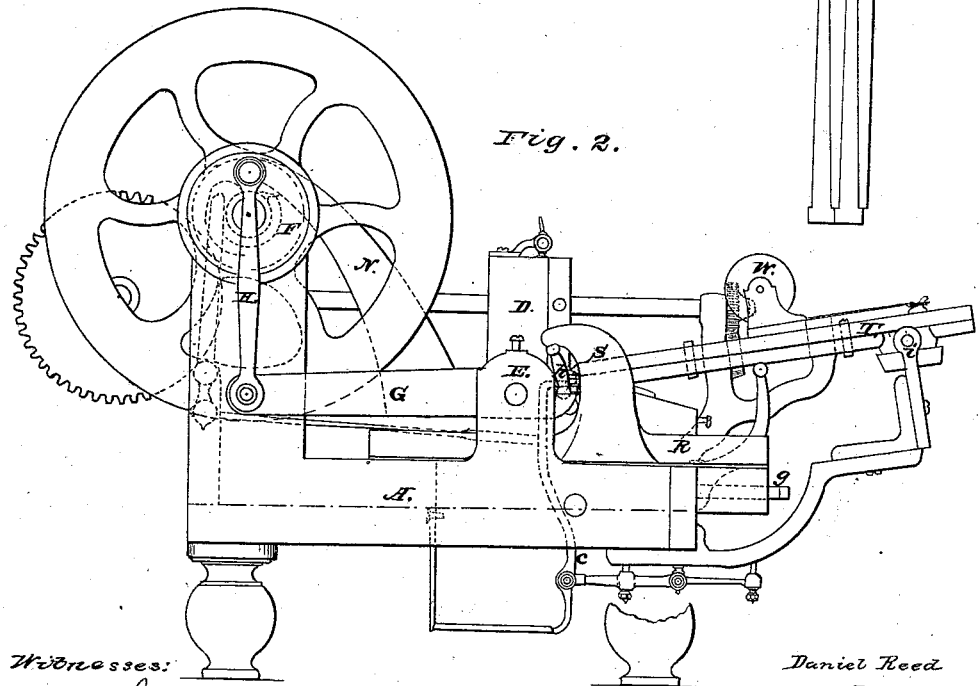
Figure 3:
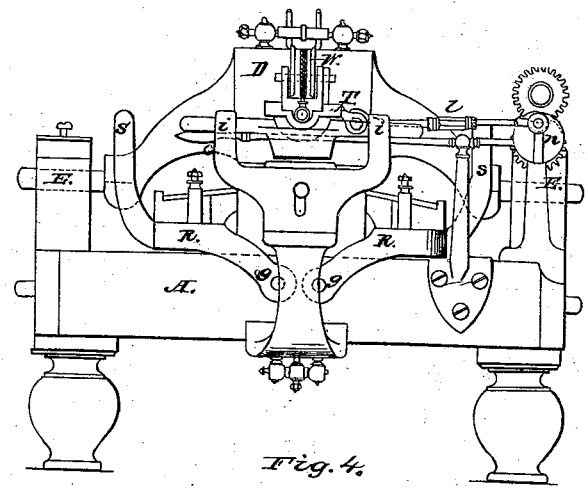
Figure 4:
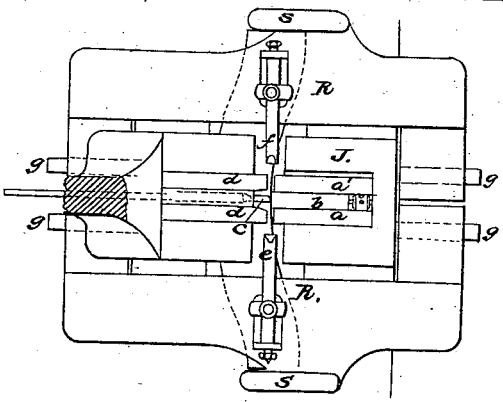
Figure 6:
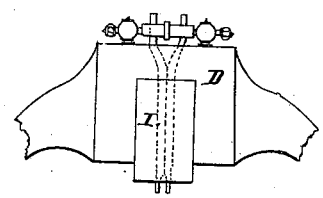
Figure 7:
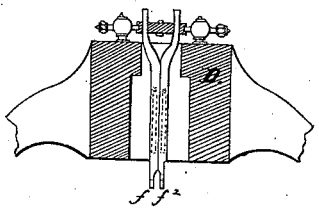

Figure 1, a top view; Fig. 2, a side view; Fig. 3, a front-end view; Fig. 4, a partial top view, the feeding device and cutters removed; Fig. 5, a diagram illustrating the manner of cutting from the sheet; Fig. 6, a detached front view of the movable cutter; and in Fig. 7, a sectional view of the cutter-head, showing the gages to regulate the width of the nail to be cut.

This invention relates to an improvement in machines for the manufacture of nails known to the trade as "cut-nails," the object of the invention being to feed the sheet from which the nails are cut without the necessity of reversing the plate, as in common nail-machines; and the invention consists in the arrangement of a plate guide or holder, which has imparted to it automatically a movement so as to present the plate to the straight vibrating cutter, so that not only the taper will be given to the nail, but a sufficient quantity of metal will be left upon the broader end to form the head; also, in the arrangement of a double gage, one of which gives the width of the first nail and the other of the second, and so on alternating; also, in the arrangement of a spring attachment to the feed, so as to automatically feed the plate as fast as the nails are cut therefrom.

To enable others to construct and use my improvement, I will proceed to describe the same as illustrated in the acccompanying drawings.

A is the bed-plate, supporting in bearings B the driving-shaft C, which is caused to revolve by the application of power thereto in any convenient manner.

D is the cutter-head, arranged upon bearings E, and is operated by eccentrics F on the driving-shaft through levers G, attached to the cutter-head, and connecting-rods H, which give a vibratory movement to the cutter-head, upon the face of which the cutter I is fixed, which is so far forward of the center movement of the cutter-head that a sufficient movement is given to the cutter for it to perform the operations required.

On a part, J, of the frame, and over the three dies $a$ $a'$ $b$, a corresponding cutter, L, is placed, so that the cutters in the cutter-head, vibrating across the edge of the cutter L, act together to cut from the sheet in similar manner as in other mail-machines.

After the nail has been cut it passes down and is turned by the lever $c$, (see Fig. 4, and in broken lines, Fig. 2,) actuated by the cam M, as denoted in Fig. 2, so as to present the blank between the dies $a$ and $a'$ in one part and the dies $d$ and $d'$ upon the end of the lever N, actuated by a cam, P, on the said lever, which firmly grasps the blank between the said dies—that is to say, when the broader or head end of the blank is at the side $d$ and $a$ of the dies, and upon those dies the head is formed, the next nail cut will present the head in like manner between the other two dies, $a'$ and $d'$.

$e$ and $f$ are the two heading-dies, fixed upon die-holders R in proper relative position to the dies $a$ and $d$ and $a'$ and $d'$, the die-holders pivoted respectively at $g$, and operated by the same eccentric of the cutter, but are raised so as to operate after the cutter has performed its operation and is returning, and this by a connection, $h$, upon the shorter arm of the lever G, which operates upon arms S upon the die-holders R.

Thus far the machine does not differ materially from nail-machines of common construction; but in such machines heretofore it has been necessary to reverse the plate, so that the head of the nail should alternately come upon opposite edges of the plate. To avoid this, I arrange a plate-guide, T, supported upon bearings $i$ at one end, and resting near or upon the cutter-holder upon the lower end, and from which extend connecting-rods $l$ and $m$ to adjustable eccentrics $n$ and $r$ upon a shaft, U, the said shaft U being caused to revolve by connection with the driving-shaft, as shown in Fig. 1, or otherwise, the two eccentrics imparting a different motion to each end of the holder T, so that, while the lower end is only carried to the right and left sufficiently far to properly place the head, the other or outer end is carried so much farther in the same direction as will give the proper taper to the nail, and this is adjusted either by the eccentric or by an adjusting-nut on the rod, either adjustment of which is a well-known device. Thus the proper vibratory motion is given to the plate-holder T to properly present the plate to the cutters to have a blank cut therefrom, and when so cut the nail is turned down between the dies and headed, as before described, in the usual manner.

Heretofore the plate from which the nails have been cut has been fed in by hand, which requires the constant attendance of a person at the machine.

I fix at any convenient point upon the plate-holder T a spring-wheel, W—that is, a wheel or cylinder to which a spring is applied to operate in similar manner as clock-springs; and in the said holder I arrange a jaw or clamp, Y, its lower end formed so as to be firmly clamped upon the sheet of metal, and to its outer end a cord or other device from the spring-cylinder W is attached, as seen in Figs. 1 and 2, so that when the clamp Y is drawn out or away from the cutters the spring is moved up, so that it tends to force the clamp Y back to its first position. The plate, being cut to the proper width, is laid in the plate-holder, and the clamp Y drawn out so as to grasp the outer end of the plate, and thus constantly bear the plate toward the cutters. Therefore, when one nail has been cut from the plate and the cutters are open, the plate will be automatically forced forward for a second cut, and so on until the plate has been consumed by successive cuts therefrom.

To thus operate, it is necessary that a guide be arranged so that the plate will be forced between the cutters to a proper distance. To this end, I arrange in the rear of the cutter I, and through the cutter-head D, a pair of guides, $f^1$ and $f^2$, the said guides being adjusted by a screw in the rear, and forced forward so as to lie close up to the cutter by a spring in the rear. The set or adjusting screw prevents either of the guides from being forced back of a certain given point, and this given point for both the guides is the width of the nail at that point—that is to say, looking at Fig. 7, if the head end of the nail be to the right, then the guide $f^2$ will lie at a wider portion of the nail than the guide $f^1$; therefore in that position the guide $f^2$ is the adjusting-guide, and the plate is forced by the spring-wheel W against the guide $f^2$ until the said guide $f^2$ comes to a bearing against its adjusting-screw in the rear. The other guide, $f^1$, will at the same time be forced back; but, the nail being narrower at that point, it will not strike its own adjusting-screw. At the next cut the head end of the nail will be to the left; then the guide $f^1$ will become the adjusting-guide, and operate in like manner as described for the other. Thus alternately acting, the two guides respectively adjust the width of the nail to be cut.

I arrange a clutch, Z, upon the shaft U, which is operated by a lever, B', to connect or disconnect the plate-holder T from the power, so that the feed may at any time be stopped.

Having thus fully described my invention, what I claim as new and useful, and desire to secure by Letters Patent, is—

1. The arrangement of the plate-holder T and the mechanism by which it is operated, substantially as described, by which the two ends of the plate are simultaneously moved in opposite directions and different portions of it presented alternately to the cutters.

2. The subject-matter of the first clause of claim, in combination with the spring-wheel W and clamp Y, as set forth.

3. The subject-matter of the second clause of claim, in combination with the guides $f^1$ and $f^2$, as and for the purpose set forth.

4. The subject-matter of the first clause of claim, combined with the cutters I and L, in the manner specified.

DANIEL REED.

Witnesses:
A. J. TIBBITTS,
J. H. SHUMWAY.